United States Patent
Kyakuno

(10) Patent No.: US 12,306,099 B2
(45) Date of Patent: May 20, 2025

(54) CONTROL APPARATUS, MEASURING INSTRUMENT, AND METHOD OF PREVENTING CONDENSATION

(71) Applicant: Yokogawa Electric Corporation, Tokyo (JP)

(72) Inventor: Toshihiko Kyakuno, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 163 days.

(21) Appl. No.: 18/127,060

(22) Filed: Mar. 28, 2023

(65) Prior Publication Data
US 2023/0314320 A1 Oct. 5, 2023

(30) Foreign Application Priority Data
Mar. 30, 2022 (JP) ................................. 2022-057653

(51) Int. Cl.
*G01N 21/59* (2006.01)
(52) U.S. Cl.
CPC ........ *G01N 21/59* (2013.01); *G01N 2201/022* (2013.01); *G01N 2201/0238* (2013.01)
(58) Field of Classification Search
CPC ...... G01N 21/15; G01N 21/59; G01N 21/532; G01N 2201/0238; G01N 2021/158; G01N 2201/022
See application file for complete search history.

(56) References Cited

U.S. PATENT DOCUMENTS

| | | | |
|---|---|---|---|
| 2003/0006223 A1* | 1/2003 | Davis | A61B 5/083 219/201 |
| 2005/0092067 A1* | 5/2005 | Petrovic | G01N 21/3504 250/338.5 |
| 2008/0060455 A1* | 3/2008 | Coyle | G01N 1/4022 73/863.12 |
| 2009/0322524 A1 | 12/2009 | Nakazato et al. | |
| 2019/0109433 A1* | 4/2019 | Takigawa | H01S 5/02423 |
| 2020/0278292 A1* | 9/2020 | Shimizu | G01N 21/51 |
| 2021/0008325 A1* | 1/2021 | Spence | A61M 16/16 |

(Continued)

FOREIGN PATENT DOCUMENTS

| | | |
|---|---|---|
| JP | 10-88935 A | 4/1998 |
| JP | 2006-153739 A | 6/2006 |
| JP | 2006-329629 A | 12/2006 |

(Continued)

OTHER PUBLICATIONS

Japanese Office Action (JPOA) dated Jan. 9, 2024 for Japanese Patent Application No. 2022-057653; English translation.

*Primary Examiner* — Sang H Nguyen
(74) *Attorney, Agent, or Firm* — RANKIN, HILL & CLARK LLP

(57) ABSTRACT

A control apparatus includes a controller configured to execute a condensation prevention process for preventing condensation on a window according to an ambient temperature and humidity of a chamber and a surface temperature of the window at the inside of the chamber, the chamber including the window and housing a light receiving element configured to receive light entering the chamber from the window via a sample for measurement located in a space outside the chamber or a light source configured to irradiate light on the sample through the window.

9 Claims, 8 Drawing Sheets

(56) References Cited

U.S. PATENT DOCUMENTS

2022/0003599 A1\* 1/2022 Shimizu ................ G01J 3/0286

FOREIGN PATENT DOCUMENTS

| | | |
|---|---|---|
| JP | 2009-48316 A | 3/2009 |
| JP | 2010-8617 A | 1/2010 |
| JP | 2010-175364 A | 8/2010 |
| JP | 2015-31415 A | 2/2015 |
| JP | 2015-232507 A | 12/2015 |
| JP | 2016-217886 A | 12/2016 |
| JP | 2021-6755 A | 1/2021 |

\* cited by examiner

FIG. 6

| AMBIENT TEMPERATURE AND HUMIDITY °C / % | 2 | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|---|
| 100 | 20.8 | 36.1 | 48.9 | 56.9 | 62.7 | 67.5 | 71.4 | 74.8 | 77.8 | 80.5 | 83.0 | 85.2 | 87.3 | 89.2 | 91.0 | 92.7 | 94.3 | 95.9 | 97.3 | 98.7 | 100 |
| 95 | 17.7 | 32.7 | 45.2 | 52.9 | 58.7 | 63.3 | 67.1 | 70.5 | 73.4 | 76.0 | 78.4 | 80.6 | 82.6 | 84.5 | 86.3 | 87.9 | 89.5 | 91.0 | 92.4 | 93.7 | 100.0 |
| 90 | 14.5 | 29.2 | 41.4 | 49.0 | 54.6 | 59.1 | 62.9 | 66.1 | 69.0 | 71.5 | 73.9 | 76.0 | 78.0 | 79.8 | 81.5 | 83.1 | 84.6 | 86.1 | 87.5 | 88.8 | 95.0 |
| 85 | 11.4 | 25.8 | 37.7 | 45.1 | 50.5 | 54.9 | 58.6 | 61.7 | 64.5 | 67.0 | 69.3 | 71.4 | 73.3 | 75.1 | 76.7 | 78.3 | 79.8 | 81.2 | 82.5 | 83.8 | 90.0 |
| 80 | 8.2 | 22.3 | 33.9 | 41.1 | 46.5 | 50.7 | 54.3 | 57.4 | 60.1 | 62.5 | 64.7 | 66.7 | 68.6 | 70.3 | 72.0 | 73.5 | 74.9 | 76.3 | 77.6 | 78.8 | 85.0 |
| 75 | 5.0 | 18.8 | 30.1 | 37.2 | 42.4 | 46.5 | 50.0 | 53.0 | 55.6 | 58.0 | 60.1 | 62.1 | 63.9 | 65.6 | 67.2 | 68.7 | 70.1 | 71.4 | 72.7 | 73.9 | 80.0 |
| 70 | 1.8 | 15.2 | 26.3 | 33.2 | 38.2 | 42.3 | 45.7 | 48.6 | 51.2 | 53.5 | 55.6 | 57.5 | 59.2 | 60.9 | 62.4 | 63.9 | 65.2 | 66.5 | 67.7 | 68.9 | 75.0 |
| 65 | -1.4 | 11.7 | 22.5 | 29.2 | 34.1 | 38.1 | 41.4 | 44.2 | 46.7 | 48.9 | 51.0 | 52.8 | 54.5 | 56.1 | 57.6 | 59.0 | 60.4 | 61.6 | 62.8 | 63.9 | 70.0 |
| 60 | -4.6 | 8.2 | 18.7 | 25.2 | 30.0 | 33.8 | 37.0 | 39.8 | 42.2 | 44.4 | 46.4 | 48.2 | 49.8 | 51.4 | 52.8 | 54.2 | 55.5 | 56.7 | 57.9 | 59.0 | 65.0 |
| 55 | -7.9 | 4.6 | 14.8 | 21.2 | 25.8 | 29.6 | 32.7 | 35.4 | 37.7 | 39.9 | 41.8 | 43.5 | 45.1 | 46.7 | 48.1 | 49.4 | 50.6 | 51.8 | 52.9 | 54.0 | 60.0 |
| 50 | -11.2 | 1.0 | 11.0 | 17.1 | 21.7 | 25.3 | 28.3 | 30.9 | 33.2 | 35.3 | 37.2 | 38.9 | 40.4 | 41.9 | 43.3 | 44.5 | 45.8 | 46.9 | 48.0 | 49.0 | 55.0 |
| 45 | -14.5 | -2.6 | 7.1 | 13.1 | 17.5 | 21.0 | 24.0 | 26.5 | 28.7 | 30.7 | 32.5 | 34.2 | 35.7 | 37.1 | 38.5 | 39.7 | 40.9 | 42.0 | 43.0 | 44.0 | 50.0 |
| 40 | -17.8 | -6.2 | 3.2 | 9.0 | 13.3 | 16.8 | 19.6 | 22.1 | 24.2 | 26.2 | 27.9 | 29.5 | 31.0 | 32.4 | 33.7 | 34.9 | 36.0 | 37.1 | 38.1 | 39.1 | 45.0 |
| 35 | -21.1 | -9.9 | -0.7 | 5.0 | 9.1 | 12.5 | 15.2 | 17.6 | 19.7 | 21.6 | 23.3 | 24.9 | 26.3 | 27.6 | 28.9 | 30.0 | 31.1 | 32.2 | 33.2 | 34.1 | 40.0 |
| 30 | -24.5 | -13.5 | -4.6 | 0.9 | 4.9 | 8.2 | 10.9 | 13.2 | 15.2 | 17.0 | 18.7 | 20.2 | 21.6 | 22.9 | 24.1 | 25.2 | 26.3 | 27.3 | 28.2 | 29.1 | 35.0 |
| 25 | -27.8 | -17.2 | -8.5 | -3.2 | 0.7 | 3.9 | 6.5 | 8.7 | 10.7 | 12.4 | 14.0 | 15.5 | 16.8 | 18.1 | 19.3 | 20.4 | 21.4 | 22.4 | 23.3 | 24.2 | 30.0 |
| 20 | -31.2 | -20.9 | -12.5 | -7.3 | -3.5 | -0.5 | 2.1 | 4.2 | 6.1 | 7.9 | 9.4 | 10.8 | 12.1 | 13.3 | 14.4 | 15.5 | 16.5 | 17.4 | 18.3 | 19.2 | 25.0 |
| 15 | -34.7 | -24.6 | -16.5 | -11.4 | -7.7 | -4.8 | -2.4 | -0.2 | 1.6 | 3.3 | 4.7 | 6.1 | 7.4 | 8.5 | 9.6 | 10.7 | 11.6 | 12.5 | 13.4 | 14.2 | 20.0 |
| 10 | -38.1 | -28.3 | -20.4 | -15.6 | -12.0 | -9.1 | -6.8 | -4.7 | -2.9 | -1.3 | 0.1 | 1.4 | 2.6 | 3.8 | 4.8 | 5.8 | 6.7 | 7.6 | 8.4 | 9.2 | 15.0 |
| 5 | -41.5 | -32.1 | -24.4 | -19.7 | -16.2 | -13.5 | -11.2 | -9.2 | -7.5 | -6.0 | -4.6 | -3.3 | -2.1 | -1.0 | 0.0 | 0.9 | 1.8 | 2.7 | 3.5 | 4.3 | 10.0 |
| 0 | -45.0 | -35.9 | -28.4 | -23.9 | -20.5 | -17.9 | -15.6 | -13.7 | -12.1 | -10.6 | -9.2 | -8.0 | -6.9 | -5.8 | -4.8 | -3.9 | -3.0 | -2.2 | -1.4 | -0.7 | 0.0 |

DEW POINT TEMPERATURE (°C) CORRESPONDING TO AMBIENT RELATIVE TEMPERATURE AND HUMIDITY

CONTROL APPARATUS, MEASURING INSTRUMENT, AND METHOD OF PREVENTING CONDENSATION

CROSS-REFERENCE TO RELATED APPLICATION

The present application claims priority to Japanese Patent Application No. 2022-057653 filed on Mar. 30, 2022, the entire contents of which are incorporated herein by reference.

TECHNICAL FIELD

The present disclosure relates to a control apparatus, a measuring instrument, and a method of preventing condensation.

BACKGROUND

Measuring instruments that optically measure a sample for measurement are known. Known examples of such measuring instruments include turbidimeters that optically measure the turbidity of a sample that is a liquid for measurement, such as industrial water. Turbidity is an indicator representing the degree to which water is turbid. The measurement methods used in turbidimeters can, for example, be classified into a transmitted light method, scattered light method, transmitted-scattered light method, surface scattered light method, integrating sphere method, and the like. In the transmitted-scattered light method, light incident from a light source onto the liquid for measurement is detected separately as transmitted light and scattered light. In the surface scattered light method, light is shone on the surface of the liquid for measurement, and the scattered light from the surface is measured. In the integrating sphere method, the ratio between the intensities of transmitted light (or total incident light) and scattered light is calculated.

Patent literature (PTL) 1 describes technology related to turbidimeters using the transmitted-scattered light method. PTL 2 describes technology related to optical water quality measurement apparatuses such as integrating sphere turbidimeters.

CITATION LIST

Patent Literature

PTL 1: JP 2006-329629 A
PTL 2: JP 2006-153739 A

SUMMARY

A control apparatus according to several embodiments includes a controller configured to execute a condensation prevention process for preventing condensation on a window according to an ambient temperature and humidity of a chamber and a surface temperature of the window at an inside of the chamber, the chamber including the window and housing a light receiving element configured to receive light entering the chamber from the window via a sample for measurement located in a space outside the chamber or a light source configured to irradiate light on the sample through the window. In such a control apparatus, the condensation prevention process is executed according to the ambient temperature and humidity of the chamber and the surface temperature of the window, which affect the occurrence of condensation. Therefore, the efficiency of condensation prevention measures is improved, since condensation prevention measures can be taken as necessary without visual observation of the window.

A method of preventing condensation according to several embodiments includes measuring an ambient temperature and humidity and a surface temperature of a window at an inside of a chamber including the window and housing a light receiving element configured to receive light entering the chamber from the window via a sample for measurement located in a space outside the chamber or a light source configured to irradiate light on the sample through the window; and executing a condensation prevention process for preventing condensation on the window according to respective measurements of the ambient temperature and humidity and the surface temperature of the window. In such a method of preventing condensation, the condensation prevention process is executed according to respective measurements of the ambient temperature and humidity of the chamber and the surface temperature of the window, which affect the occurrence of condensation. Therefore, the efficiency of condensation prevention measures is improved, since condensation prevention measures can be taken as necessary without visual observation of the window.

BRIEF DESCRIPTION OF THE DRAWINGS

In the accompanying drawings:

FIG. 6 is a conversion table for explaining procedures to calculate the dew point temperature according to an embodiment of the present disclosure;

DETAILED DESCRIPTION

Figure 1:
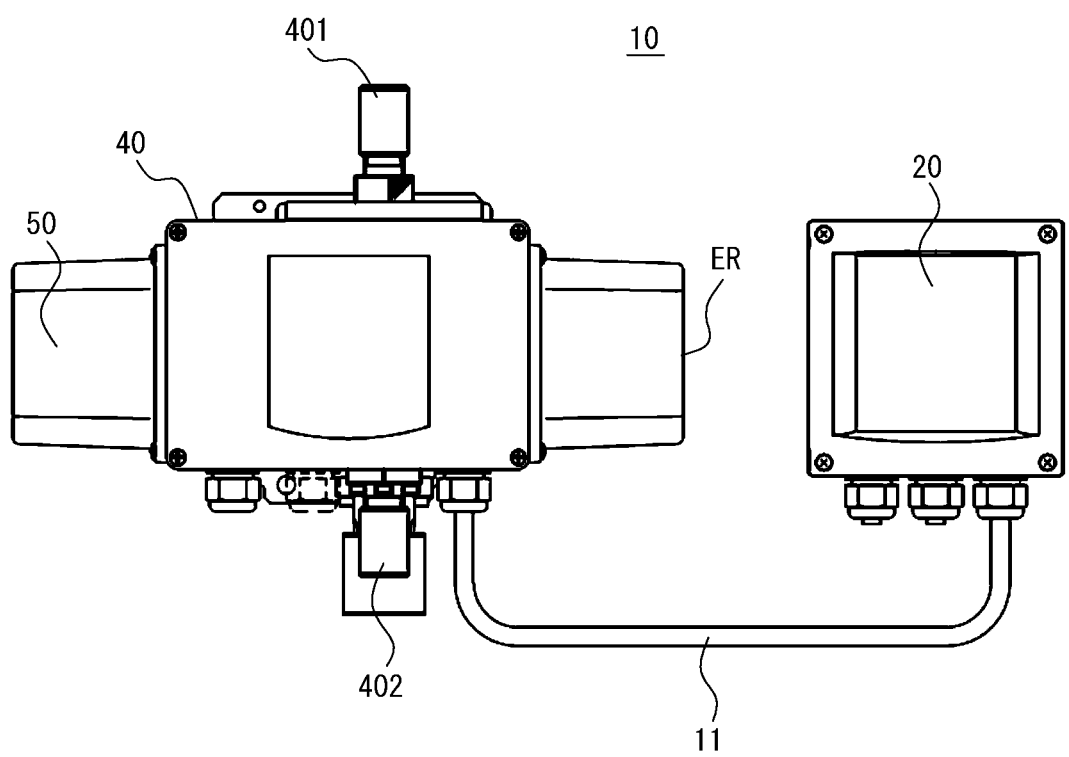
FIG. 1 is a diagram illustrating an example of the appearance of a measuring instrument as an aspect of the present disclosure.

In a measuring instrument such as a turbidimeter, the sample for measurement and the light receiving element included in the measuring instrument are, for example, separated by a window made of glass, resin, or the like. Light passing through the sample is incident on the light receiving element via the window. The amount of light, such as transmitted light and scattered light, may not be measured accurately if condensation occurs on the window, resulting in errors in the acquired measurement values of turbidity.

In contrast, in a case in which the turbidity value changes, the measurement error could be corrected by identifying whether the change was due to turbidity or to condensation. To identify whether a change in the turbidity value is due to turbidity or to condensation with the technology described in PTL 1, it is necessary, for example, for a facility manager or other user to visually observe the window.

In the technology described in PTL 2, condensation prevention measures are taken to prevent condensation on the window regardless of the occurrence of condensation. Therefore, condensation prevention measures that are taken when condensation has not occurred are a waste.

It would be helpful to improve the efficiency of condensation prevention measures.

A control apparatus according to several embodiments includes a controller configured to execute a condensation prevention process for preventing condensation on a window according to an ambient temperature and humidity of a chamber and a surface temperature of the window at an inside of the chamber, the chamber including the window and housing a light receiving element configured to receive light entering the chamber from the window via a sample for measurement located in a space outside the chamber or a light source configured to irradiate light on the sample through the window. In such a control apparatus, the condensation prevention process is executed according to the ambient temperature and humidity of the chamber and the surface temperature of the window, which affect the occurrence of condensation. Therefore, the efficiency of condensation prevention measures is improved, since condensation prevention measures can be taken as necessary without visual observation of the window.

In an embodiment, the controller of the control apparatus is configured to calculate a dew point temperature inside the chamber based on the ambient temperature and humidity of the chamber, determine whether a predictor of the condensation exists or whether the condensation has occurred by comparing the calculated dew point temperature with the surface temperature of the window, and execute the condensation prevention process upon determining that the predictor of the condensation exists or that the condensation has occurred. According to this embodiment, the occurrence of condensation can be predicted in advance, and condensation prevention measures can be taken before condensation occurs, thus enabling prevention of the occurrence of condensation. Measurement errors in optical measurements caused by condensation can thereby be prevented. The existence of condensation can also be determined without visual observation of the window, thereby improving the efficiency of condensation prevention measures, since condensation prevention measures can be taken as necessary.

In an embodiment, as the condensation prevention process, the controller of the control apparatus is configured to execute a process to output data notifying a user that the predictor of the condensation exists or that the condensation has occurred, or data urging the user to take measures to prevent the condensation. According to this embodiment, the user can recognize in advance that condensation will occur. For example, users can prevent condensation by taking condensation prevention measures themselves, even if no condensation prevention apparatus is installed inside the chamber. Users can also recognize the occurrence of condensation without visual observation of the window. For example, users can remove condensation by taking condensation prevention measures themselves, even if no condensation prevention apparatus is installed inside the chamber.

In an embodiment, as the condensation prevention process, the controller of the control apparatus is configured to execute a process to control a condensation prevention apparatus installed inside the chamber and to start operation of the condensation prevention apparatus. According to this embodiment, condensation prevention measures are automatically taken before condensation occurs or are automatically taken when condensation occurs, eliminating the need for users to take condensation prevention measures themselves. Furthermore, since the condensation prevention apparatus operates as needed, unnecessary operation of the condensation prevention apparatus can be prevented as compared to the case in which a condensation prevention process is executed regardless of the occurrence of condensation. The efficiency of condensation prevention is thereby improved.

In an embodiment, the controller of the control apparatus is configured to set a stopping condition for stopping the condensation prevention apparatus with respect to the surface temperature of the window, and in a case in which a surface temperature of the window at the inside of the chamber after execution of the condensation prevention process satisfies the stopping condition, execute a process to control the condensation prevention apparatus and to stop the operation of the condensation prevention apparatus. According to this embodiment, unnecessary operation of the condensation prevention apparatus can be suppressed to lower the operation cost. By stopping operation of the condensation prevention apparatus, the operating time of the condensation prevention apparatus can be reduced, and the duration of consumables used in the condensation prevention apparatus can be extended.

In an embodiment, the controller of the control apparatus is configured to determine that the predictor of the condensation exists in a case in which a difference yielded by subtracting the dew point temperature from the surface temperature of the window is greater than 0 and equal to or less than a threshold and determine that the predictor of the condensation does not exist in a case in which the difference is greater than the threshold. According to this embodiment, complex processing is unnecessary, since the existence of a predictor of condensation is determined by comparison with a threshold. Processing efficiency is thereby improved.

In an embodiment, the controller of the control apparatus is configured to determine that the condensation has occurred in a case in which the surface temperature of the window is equal to or less than the dew point temperature and determine that the condensation has not occurred in a case in which the surface temperature of the window is greater than the dew point temperature. According to this embodiment, complex processing is unnecessary, since the occurrence of condensation is determined by a comparison of temperatures. Processing efficiency is thereby improved.

In an embodiment, the controller of the control apparatus is configured to calculate the dew point temperature based further on an ambient air pressure of the chamber. According to this embodiment, the dew point temperature is calculated by taking into account the effect of fluctuations in the ambient air pressure of the chamber. The dew point temperature can therefore be calculated even more accurately.

A measuring instrument according to several embodiments includes the control apparatus, the chamber, the light receiving element or the light source, and a sensor group configured to measure the ambient temperature and humidity of the chamber and the surface temperature of the window. In such a measuring instrument, condensation prevention measures can be taken as necessary without visual observation of the window. The efficiency of condensation prevention is thereby improved.

In an embodiment, the control apparatus is configured to measure turbidity of the sample based on light received by the light receiving element. According to this embodiment, condensation prevention measures can be taken as necessary, thereby improving the efficiency of the condensation prevention measures. At the same time, the occurrence of condensation that can cause errors in the resulting turbidity measurement can be suppressed, thereby enabling more accurate measurement of turbidity.

A method of preventing condensation according to several embodiments includes measuring an ambient temperature and humidity and a surface temperature of a window at an inside of a chamber including the window and housing a light receiving element configured to receive light entering the chamber from the window via a sample for measurement located in a space outside the chamber or a light source configured to irradiate light on the sample through the window; and executing a condensation prevention process for preventing condensation on the window according to respective measurements of the ambient temperature and humidity and the surface temperature of the window. In such a method of preventing condensation, the condensation prevention process is executed according to respective measurements of the ambient temperature and humidity of the chamber and the surface temperature of the window, which affect the occurrence of condensation. Therefore, the efficiency of condensation prevention measures is improved, since condensation prevention measures can be taken as necessary without visual observation of the window.

According to the present disclosure, the efficiency of condensation prevention is improved.

The present disclosure is now described with reference to the drawings.

Identical or equivalent portions in the drawings are labeled with the same reference signs. In the explanation of the present disclosure, a description of identical or equivalent portions is omitted or simplified as appropriate.

Figure 2:
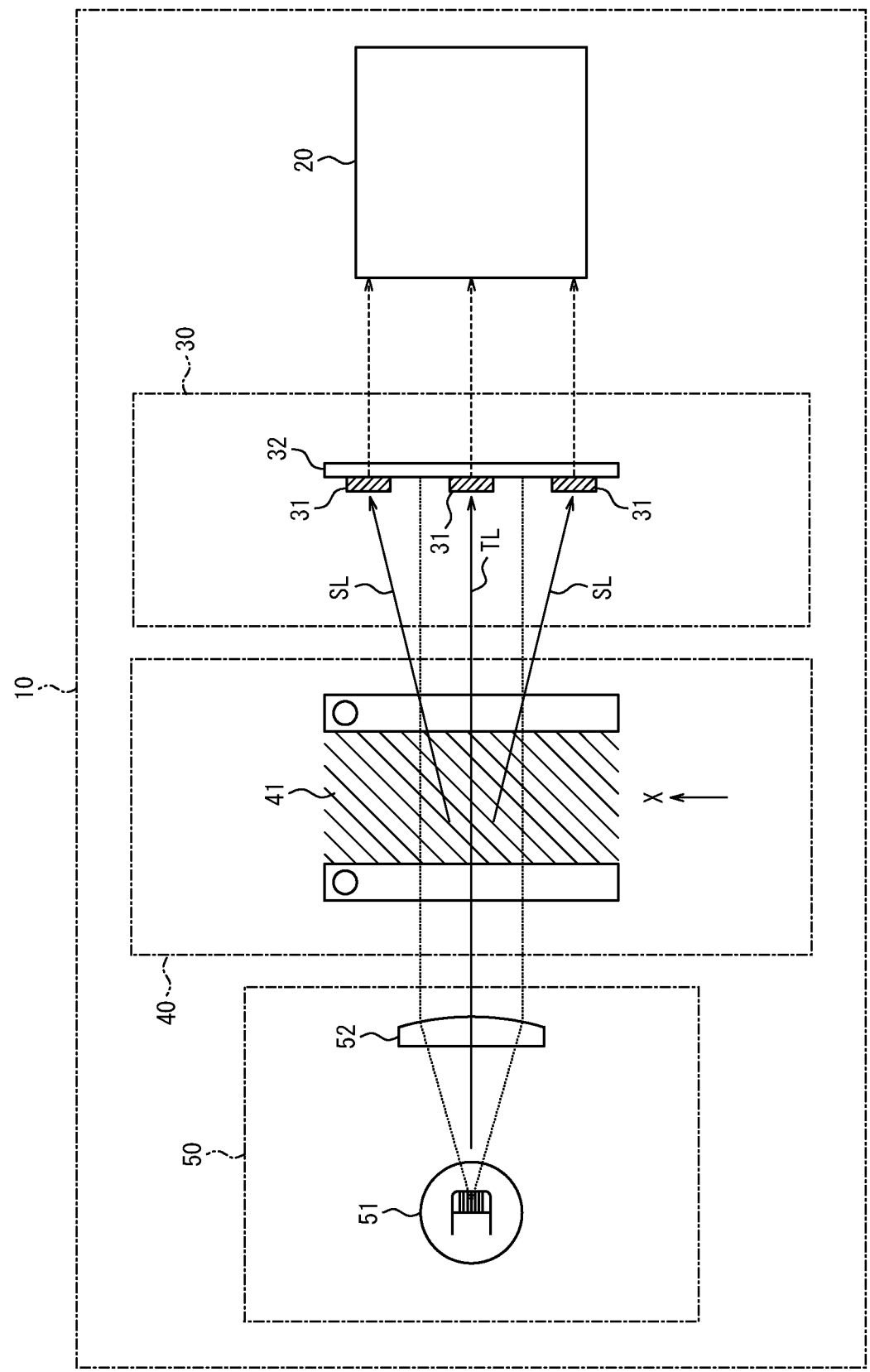
FIG. 2 is a diagram illustrating an example configuration of the measuring instrument as an aspect of the present disclosure.
Figure 3:
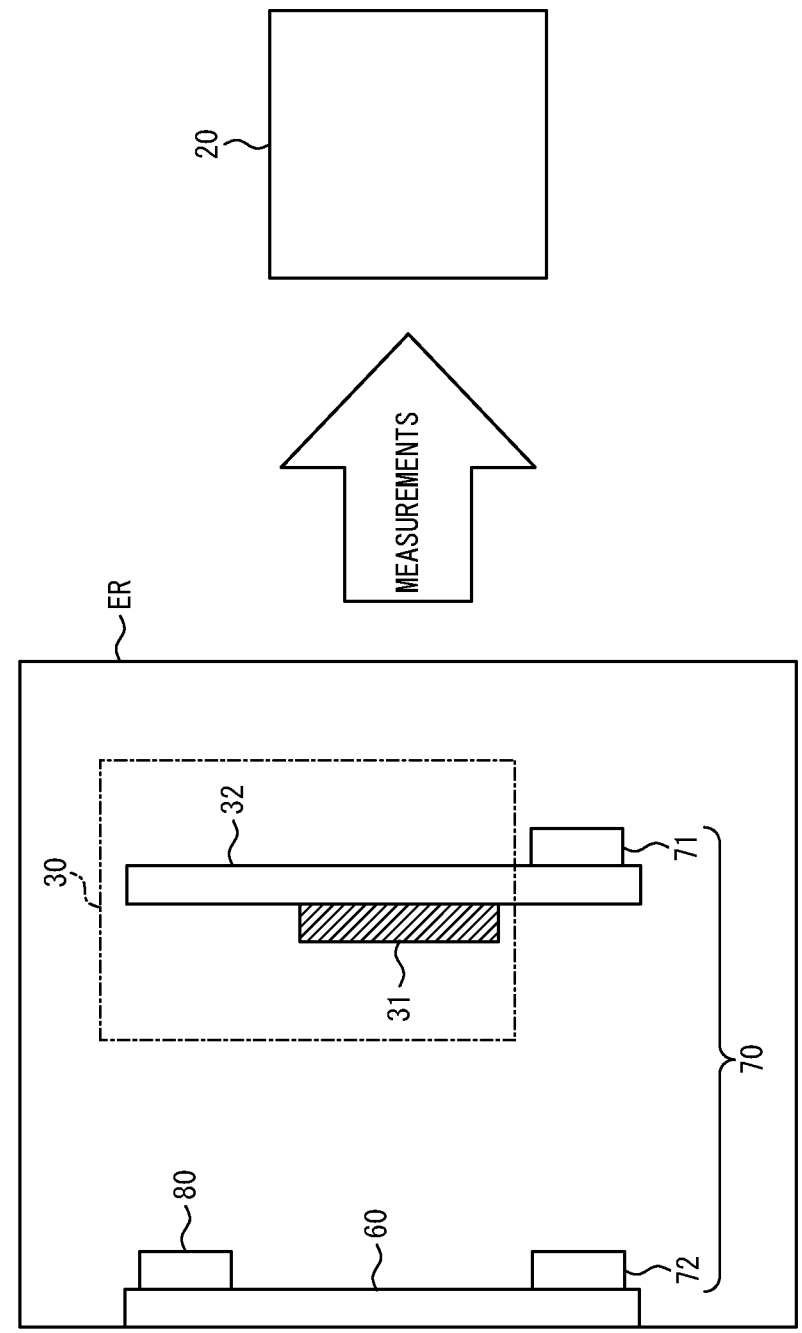
FIG. 3 is a diagram illustrating an example configuration of a chamber in the measuring instrument as an aspect of the present disclosure.

With reference to FIGS. 1 to 3, an example configuration of a measuring instrument 10 as an aspect of the present disclosure is described.

The measuring instrument 10 as an aspect of the present disclosure is an apparatus configured to measure turbidity based on light received through a sample 41 for measurement. The measuring instrument 10 is described below as a turbidimeter using the transmitted-scattered light method.

The measuring instrument 10 includes a main body 40; a control apparatus 20; a chamber ER; a light receiving apparatus 30, a sensor group 70, and a condensation prevention apparatus 80 housed in the chamber ER; and a light source apparatus 50. The main body 40 has a sample inlet 402 through which a liquid for measurement as the sample 41 flows into the main body 40 and a sample outlet 401 through which the sample 41 exits after flowing in.

The light source apparatus 50 includes a light source 51 and a lens 52. The light source 51 is, for example, a light bulb or LED. "LED" is an abbreviation of light emitting diode.

The light receiving apparatus 30 includes a light receiving element mounting substrate 32 and one or more light receiving elements 31 installed on the light receiving element mounting substrate 32. Three light receiving elements 31 are illustrated in FIG. 2, but the number of light receiving elements 31 is not limited to three and may be selected freely according to the number and type of received light signals. The light receiving element 31 converts received light to a current signal. For example, the light receiving element 31 is a photodiode.

The control apparatus 20 is a computer. The control apparatus 20 is a dedicated device in the example in FIG. 1, but other examples include a general purpose device such as a mobile device or PC and a server device belonging to a cloud computing system or other computing system. "PC" is an abbreviation of personal computer. Mobile devices include mobile phones, smartphones, or tablets.

The control apparatus 20 performs, for example, calculation processing based on signals acquired from the light receiving apparatus 30 or the sensor group 70 and control processing of the measuring instrument 10 overall. The control apparatus 20 communicates with the light receiving apparatus 30, for example, and acquires a detection signal from the light receiving apparatus 30 based on light detected by the light receiving apparatus 30. The control apparatus 20 communicates with the sensor group 70 and acquires measurements obtained by the sensor group 70. The control apparatus 20 communicates with the condensation prevention apparatus 80 and controls the operations of the condensation prevention apparatus 80. The communication is performed via a cable 11 in the example in FIG. 1, but in other examples, the communication may be performed wirelessly or via a network such as a LAN or the Internet. "LAN" is an abbreviation of local area network. For example, communication may be performed using a communication interface compatible with mobile communication standards such as LTE, 4G, or 5G standards, wireless LAN communication standards such as IEEE 802.11, or wired LAN communication standards such as Ethernet® (Ethernet is a registered trademark in Japan, other countries, or both). "LTE" is an abbreviation of Long Term Evolution. "4G" is an abbreviation of 4th generation. "5G" is an abbreviation of 5th generation. "IEEE" is an abbreviation of Institute of Electrical and Electronics Engineers.

Although the control apparatus 20 is connected to the light receiving apparatus 30, the sensor group 70, and the condensation prevention apparatus 80 via the main body 40 of the measuring instrument 10, the present disclosure is not limited to this configuration. The control apparatus 20 may be housed in the chamber ER and directly connected to the light receiving apparatus 30, the sensor group 70, and the condensation prevention apparatus 80. Alternatively, the control apparatus 20 may be configured as a computer, such as a server belonging to a cloud computing system or other computing system, and be installed remotely.

With reference to FIG. 2, the operating principle of the measuring instrument 10 is now described.

In the measuring instrument 10, the sample 41 passes through the interior of the main body 40 in the direction of the arrow X. Light irradiated towards the sample 41 by the light source 51 of the light source apparatus 50 is received by each of the light receiving elements 31 of the light receiving apparatus 30 via the lens 52 and the sample 41. Here, the light incident on the sample 41 is received by the light receiving elements 31 as transmitted light TL linearly transmitted through the sample 41 and scattered light SL scattered by a substance mixed in the sample 41. Light received by the light receiving elements 31 is converted into a current signal having a current value corresponding to the intensity of the light. This current signal is converted by an optical receiver, such as a TIA, into a voltage signal with a voltage value corresponding to the light intensity. "TIA" is an abbreviation of Transimpedance Amplifier. The voltage signal is further converted into a digital signal and outputted to the control apparatus 20. The control apparatus measures the turbidity of the sample 41 based on the outputted signal.

A configuration example of the chamber ER is provided with reference to FIG. 3.

In FIG. 3, the chamber ER is configured as an electrical chamber that includes a window 60 and houses the light receiving apparatus 30 provided with the light receiving element mounting substrate 32 and the light receiving elements 31 installed on the light receiving element mounting substrate 32. Inside the chamber ER, the sensor group 70 and the condensation prevention apparatus 80 are further installed. The sensor group 70 includes a temperature and humidity sensor 71 that measures the ambient temperature and humidity of the chamber ER and a temperature sensor 72 that measures the surface temperature of the window 60 at the inside of the chamber ER. In FIG. 3, the temperature and humidity sensor 71 is installed on the light receiving element mounting substrate 32, but the present disclosure is not limited to this configuration, and any configuration can be adopted as long as the ambient temperature and humidity of the chamber ER can be measured. For example, a general purpose device can be used as the temperature and humidity sensor 71. Alternatively, a dedicated device can be used as the temperature and humidity sensor 71. The temperature sensor 72 that measures the surface temperature of the window 60 is installed on the surface of the window 60, but the present disclosure is not limited to this configuration, and any configuration can be adopted as long as the surface temperature of the window 60 can be measured. For example, any sensor such as a contact or non-contact sensor can be used as the temperature sensor 72, and in the present disclosure, a thermocouple configured by two different metal conductors can be used. The measurement of the ambient temperature and humidity obtained by the temperature and humidity sensor 71 and the measurement of the surface temperature of the window 60 obtained by the temperature sensor 72 are transmitted from the sensor group 70 to the control apparatus 20.

In the present disclosure, the window 60 is an optical window for measurement and is provided at the boundary between the chamber ER and the sample 41. Without the window 60, each electronic device, such as the light receiving apparatus 30, sensor group 70, and condensation prevention apparatus 80 housed inside the chamber ER, would degrade faster due to the moisture of the liquid for measurement as the sample 41, the chlorine contained in tap water, or the surrounding corrosive gases. Therefore, the window 60 is provided to isolate each electronic device from exposure to the atmosphere of the liquid for measurement. The window 60 can have any configuration that allows light from the sample 41 to enter the chamber ER and can, for example, be formed using glass, resin, or the like.

In FIG. 3, the light receiving element 31 receives light that entered the chamber ER through the window 60 via the sample 41 for measurement that is located in the space outside the chamber ER. Only one light receiving element 31 is illustrated in FIG. 3, but in reality, three light receiving elements 31 are provided. As described above, however, the number of light receiving elements 31 is not limited to three and may be selected freely according to the number and type of received light signals.

The condensation prevention apparatus 80 can be any apparatus capable of preventing condensation from occurring on the surface of the window 60. For example, a condensation prevention heater that has the function of blowing dry air on the window 60, a hot wire heater that is wired on the window 60 and generates heat to increase the surface temperature of the window 60 and thereby prevent condensation from occurring, or a membrane heater that is a heat source installed on the window 60 can be used as the condensation prevention apparatus 80. The configuration of a membrane heater is, for example, described in JP 2022-012984 A. In the present disclosure, the condensation prevention apparatus 80 is controlled by the control apparatus 20 to increase the surface temperature of the window 60 so as to prevent condensation.

An embodiment is described below as a specific example of the present disclosure.

An overview of the present embodiment is provided with reference to FIG. 3.

The sensor group 70 measures the ambient temperature and humidity and the surface temperature of the window 60 at the inside of the chamber ER. The control apparatus 20 acquires each measurement of the ambient temperature and humidity and the surface temperature of the window 60 from the sensor group 70. The control apparatus 20 executes a condensation prevention process for preventing condensation on the window 60 according to each of the acquired measurements. That is, the control apparatus 20 executes the condensation prevention process for preventing condensation on the window 60 according to the ambient temperature and humidity of the chamber ER and the surface temperature of the window 60 at the inside of the chamber ER.

In the measuring instrument 10, the window 60 is cooled by the sample 41, and its surface temperature decreases when there is a difference between the temperature of the sample 41 and the temperature in the chamber ER, especially when the temperature of the sample 41 is lower than the temperature in the chamber ER. Upon a decrease in the surface temperature of the window 60, condensation may occur on the surface of the window 60 due to moisture in the air in the chamber ER. If condensation occurs on the window 60, the amount of transmitted light TL or scattered light SL cannot be measured accurately, and an error will occur in the measured turbidity. This is because the condensation on the window 60 ends up being considered part of the turbidity. In a case in which the turbidity value increases, a user, such as a worker, for example, could visually observe the window 60 to determine if the error is caused by condensation, but this approach is time-consuming. The user could also employ a rule of thumb to determine whether an error caused by condensation has occurred, but it is difficult to make such determinations accurately.

Furthermore, some condensation prevention measures are costly, and taking condensation prevention measures despite condensation not having occurred incurs unnecessary costs. The duration of components or materials included in the condensation prevention apparatus 80 would also be needlessly reduced.

In the present embodiment, the condensation prevention process is executed according to the ambient temperature and humidity of the chamber ER and the surface temperature of the window 60. In other words, the condensation prevention apparatus 80 operates as needed. According to the present embodiment, time can be saved and the efficiency of condensation prevention measures is improved, since condensation prevention measures can be taken as necessary without visual observation of the window 60.

Figure 4:
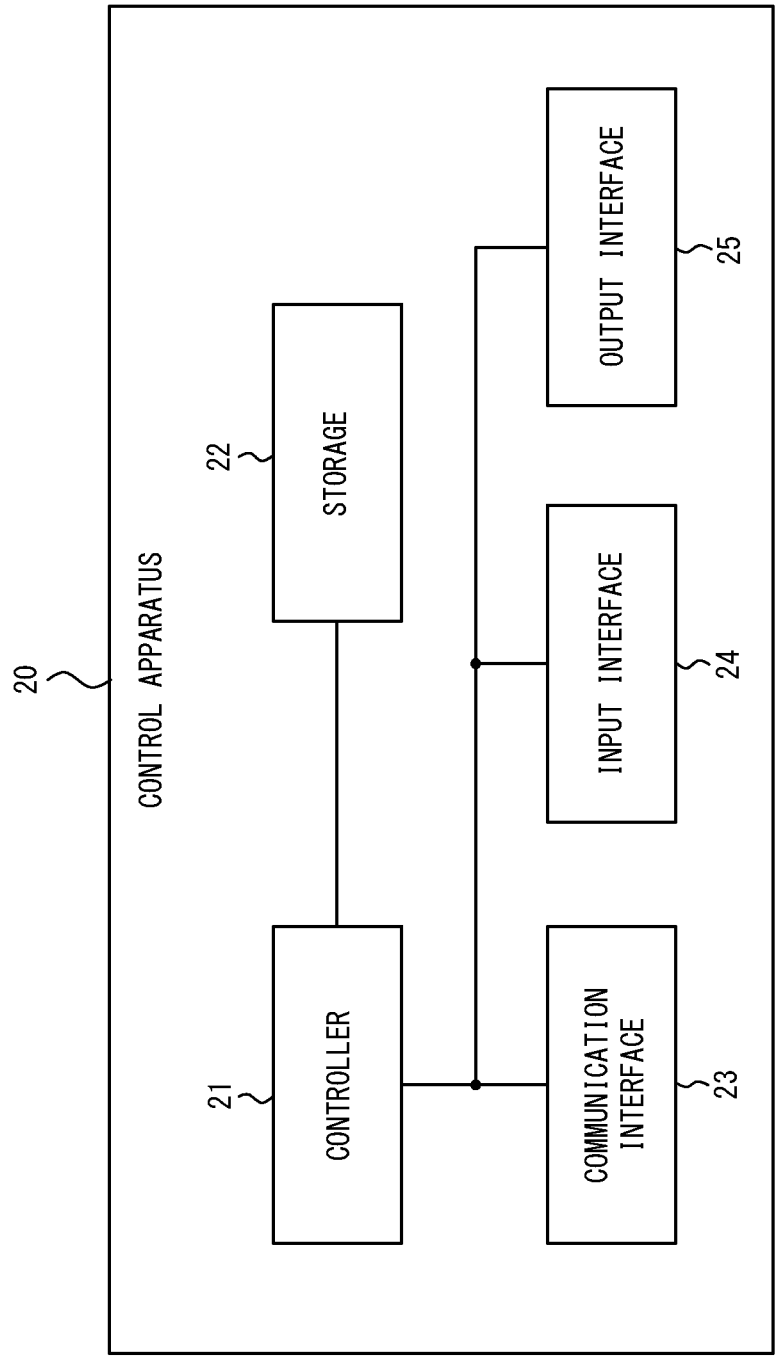
FIG. 4 is a block diagram illustrating a configuration of a control apparatus according to an embodiment of the present disclosure.

With reference to FIG. 4, a configuration of the control apparatus 20 according to the present embodiment is described.

The control apparatus 20 includes a controller 21, a storage 22, a communication interface 23, an input interface 24, and an output interface 25.

The controller 21 includes at least one processor, at least one programmable circuit, at least one dedicated circuit, or any combination thereof. The processor may be a general purpose processor, such as a CPU or GPU, or a dedicated processor specialized for particular processing. "GPU" is an abbreviation of graphics processing unit. The programmable circuit is, for example, an FPGA. "FPGA" is an abbreviation of field-programmable gate array. The dedicated circuit is, for example, an ASIC. "ASIC" is an abbreviation of application specific integrated circuit. The controller 21 executes processing related to operation of the control apparatus 20 while controlling each component of the control apparatus 20.

The storage 22 includes at least one semiconductor memory, at least one magnetic memory, at least one optical memory, or any combination thereof. The semiconductor memory is, for example, RAM, ROM, or SSD. "RAM" is an abbreviation of random access memory. "ROM" is an abbreviation of read only memory. "SSD" is an abbreviation of solid state drive. The RAM is, for example, SRAM or DRAM. "SRAM" is an abbreviation of static random access memory. "DRAM" is an abbreviation of dynamic random access memory. The ROM is, for example, EEPROM. "EEPROM" is an abbreviation of electrically erasable programmable read only memory. The magnetic memory is, for example, an HDD. "HDD" is an abbreviation of hard disk drive. The storage 22 functions as, for example, a main memory, an auxiliary memory, or a cache memory. The storage 22 stores data to be used for operation of the control apparatus 20 and data resulting from operation of the control apparatus 20.

The communication interface 23 includes at least one interface for communication. The interface for communication is, for example, an interface corresponding to a mobile communication standard such as LTE, the 4G standard, or the 5G standard, a wireless LAN communication standard such as IEEE 802.11, or a wired LAN communication standard such as Ethernet®. The communication interface 23 receives data for use in operation of the control apparatus 20 and transmits data resulting from operation of the control apparatus 20.

The input interface 24 includes at least one interface for input. The interface for input is, for example, a physical key, a capacitive key, a pointing device, a touchscreen integrated with a display, a camera, or a microphone. The input interface 24 receives an operation for inputting data used in operation of the control apparatus 20. Instead of being provided in the control apparatus 20, the input interface 24 may be connected to the control apparatus 20 as an external input device. As the interface for connection, an interface compliant with a standard such as USB, HDMI®, or Bluetooth® can be used. "USB" is an abbreviation of Universal Serial Bus. "HDMI®" is an abbreviation of High-Definition Multimedia Interface.

The output interface 25 includes at least one interface for output. The interface for output is, for example, a display or speaker. The display is, for example, an LCD or an organic EL display. "LCD" is an abbreviation of liquid crystal display. "EL" is an abbreviation of electro luminescence. The output interface 25 outputs data resulting from operation of the control apparatus 20. Instead of being provided in the control apparatus 20, the output interface 25 may be connected to the control apparatus 20 as an external output device. As the interface for connection, an interface compliant with a standard such as USB, HDMI®, or Bluetooth® can be used. An interface that supports the ISA100 industrial wireless standard or LoRaWAN® (LoRaWAN is a registered trademark in Japan, other countries, or both) may be used as the connection interface. "ISA" is an abbreviation of International Society of Automation. "LoRaWAN" is an abbreviation of Long Range Wide Area Network.

The functions of the control apparatus 20 are implemented by a processor as the controller 21 executing a program according to the present embodiment. In other words, the functions of the control apparatus 20 are implemented by software. The program causes a computer to function as the control apparatus 20 by causing the computer to execute the operations of the control apparatus 20. In other words, the computer functions as the control apparatus 20 by executing the operations of the control apparatus 20 according to the program.

The program can be stored on a non-transitory computer readable medium. The non-transitory computer readable medium is, for example, a flash memory, a magnetic recording device, an optical disk, a magneto-optical recording medium, or ROM. The program is, for example, distributed by the sale, transfer, or lending of a portable recording medium such as an SD card, DVD, or CD-ROM on which the program is stored. "SD" is an abbreviation of Secure Digital. "DVD" is an abbreviation of digital versatile disc. "CD-ROM" is an abbreviation of compact disc read only memory. The program may be distributed by being stored on a storage of a server and transferred from the server to another computer. The program may be provided as a program product.

For example, the computer can temporarily store, in the main memory, the program recorded on the portable medium or transferred from the server. The computer uses a processor to read the program stored in the main memory and executes processing with the processor in accordance with the read program. The computer may read the program directly from the portable medium and execute processing in accordance with the program. Each time the program is transferred from the server to the computer, the computer may sequentially execute processing in accordance with the received program. Processing may be executed by an ASP type of service that implements functions only via execution instructions and result acquisition, without transferring the program from the server to the computer. "ASP" is an abbreviation of application service provider. Examples of the program include an equivalent to the program represented as information provided for processing by an electronic computer. For example, data that is not a direct command for a computer but that has the property of specifying processing by the computer corresponds to the "equivalent to the program".

A portion or all of the functions of the control apparatus 20 may be implemented by a programmable circuit or a dedicated circuit as the controller 21. In other words, a portion or all of the functions of the control apparatus 20 may be implemented by hardware.

Figure 5:
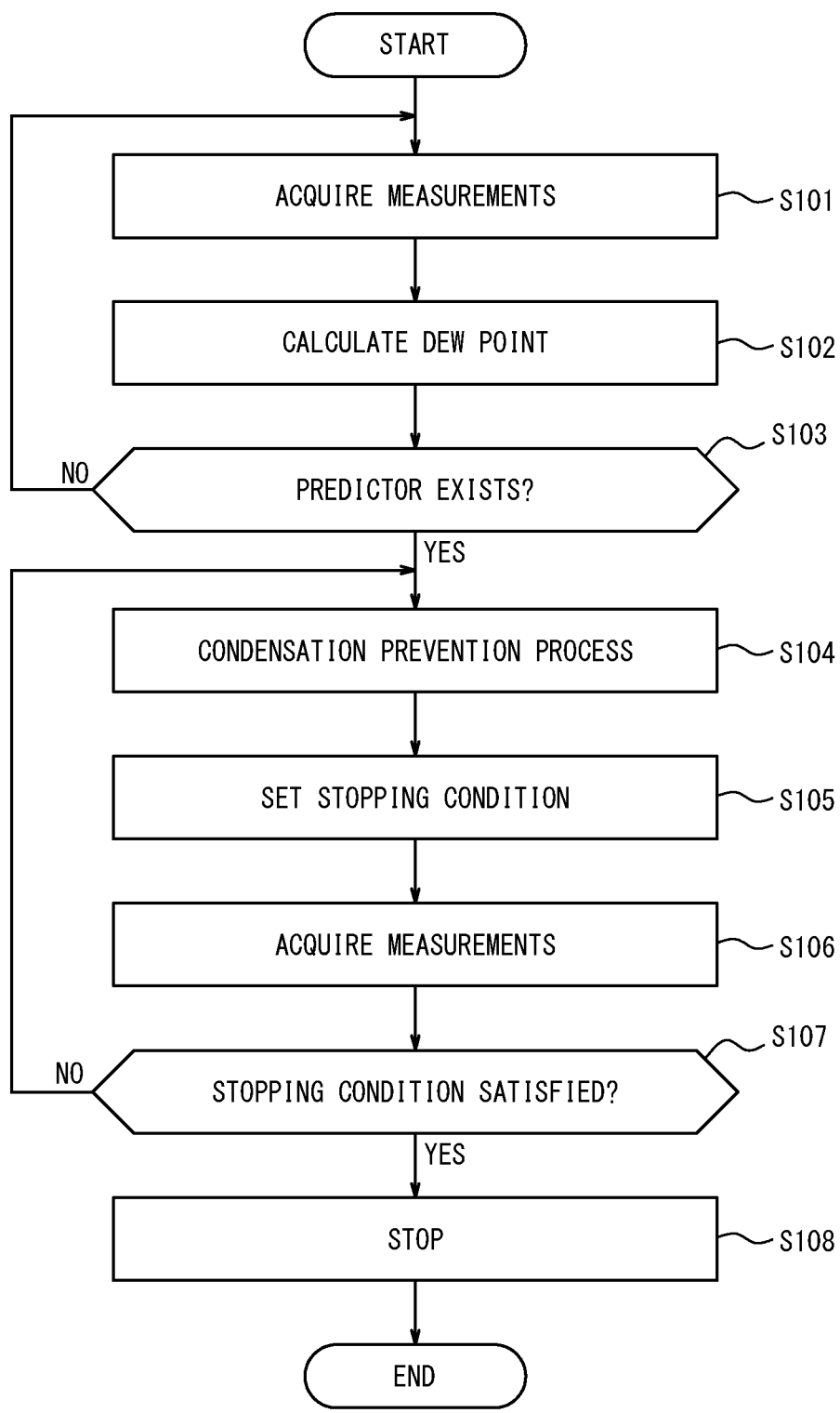
FIG. 5 is a flowchart illustrating operations of a measuring instrument according to an embodiment of the present disclosure.

With reference to FIG. 5, operations of the measuring instrument 10 according to the present embodiment are described. These operations correspond to a method of preventing condensation according to the present embodiment.

When the measuring instrument 10 starts up, or an operation to start measurement is performed after startup, the light source 51 of the light source apparatus 50 is driven and irradiates light onto the sample 41. The light irradiated by the light source 51 is incident on the sample 41. The light incident on the sample 41 either passes through the sample 41 or is reflected by a substance mixed in the sample 41. The light receiving element 31 of the light receiving apparatus 30 receives the light that entered the chamber ER through the window 60 via the sample 41. Specifically, the light receiving element 31 receives the transmitted light TL that passes through the sample 41 and enters the chamber ER through the window 60 and the scattered light SL that is reflected by the substance mixed in the sample 41 and enters the chamber ER through the window 60. The light receiving element 31 converts the received light to a current signal. The current signal from the light receiving element 31 is converted into a voltage signal and then further converted into a digital signal and outputted to the control apparatus 20.

In step S101, the temperature and humidity sensor 71 and the temperature sensor 72 included in the sensor group 70 respectively measure the ambient temperature and humidity and the surface temperature of the window 60 at the inside of the chamber ER. The controller 21 of the control apparatus 20 acquires each measurement of the ambient temperature and humidity and the surface temperature of the window 60 from the sensor group 70 via the communication interface 23. That is, the controller 21 acquires, via the communication interface 23, the measurement of the ambient temperature and humidity of the chamber ER obtained by the temperature and humidity sensor 71 and the measurement of the surface temperature of the window 60, at the inside the chamber ER, obtained by the temperature sensor 72.

In step S102, the controller 21 of the control apparatus 20 calculates the dew point temperature inside the chamber ER. The dew point temperature may be calculated by any appropriate procedure. For example, calculation can be performed using a known formula such as the calculation formula described in JIS Z8806:2001. "JIS" is an abbreviation of Japan Industrial Standards. Alternatively, the dew point temperature may be calculated using another index value, such as the water vapor pressure obtained by the Clausius-Clapeyron formula. The dew point temperature may be calculated incorporating the features inside the chamber ER or from the actual measurement. The features inside the chamber ER include, for example, the presence or absence of heating elements other than the condensation prevention apparatus 80, the amount of air blown on the window 60, the performance of a desiccant, the air pressure, or other physical phenomena.

In the present embodiment, the dew point temperature is calculated in advance based on the ambient temperature and ambient humidity. A definition table that associates the calculated dew point temperature with a combination of ambient temperature and ambient humidity is prepared as a conversion table and is used in step S102. In the present embodiment, the conversion table is stored in the storage 22. Alternatively, the conversion table may be stored in an external system.

FIG. 6 illustrates an example of a conversion table for the dew point temperatures calculated relative to the ambient relative temperature and humidity. The horizontal axis of the conversion table represents the ambient relative humidity, with columns from 5% to 100% defined in 5% increments, except for the 2% column. The relative humidity is a value indicating how much moisture is contained in the air compared to the saturated water vapor content. The vertical axis of the conversion table represents the ambient temperature, and the rows from 0° C. to 100° C. are defined in 5° C. increments. As illustrated by the rows and columns surrounded by the dashed lines in the conversion table in FIG. 6, when the ambient temperature is 30.0° C. and the ambient relative humidity is 60.0%, for example, the dew point temperature at the intersection of the two is 21.6° C. Condensation is considered to occur when the surface temperature of the window 60 is equal to or less than this dew point temperature.

In the present embodiment, the controller 21 of the control apparatus refers to the conversion table illustrated in FIG. 6 and calculates the dew point temperature corresponding to the measurement of the ambient temperature and humidity, among the respective measurements acquired from the sensor group 70 in step S101, as the dew point temperature inside the chamber ER. For example, suppose that, as measured by the temperature and humidity sensor 71, the ambient temperature is 30.0° C. and the ambient humidity is 60.0%. In this case, the controller 21 calculates the dew point temperature as 21.6° C. by referring to the conversion table in FIG. 6.

In step S103, the controller 21 of the control apparatus 20 determines whether a predictor of condensation exists. Specifically, the controller 21 determines whether a predictor of condensation exists by comparing the calculated dew point temperature obtained in step S102 with the measurement of the surface temperature of the window 60 acquired in step S101. More specifically, the controller 21 calculates the difference yielded by subtracting the calculated dew point temperature corresponding to the measured ambient temperature and humidity of the chamber ER obtained by the temperature and humidity sensor 71 from the measurement of the surface temperature of the window 60 obtained by the temperature sensor 72. The controller 21 determines that a predictor of condensation exists in a case in which the calculated difference is greater than 0 and equal to or less than a threshold TH. This is because the window 60 is thought to cool gradually, with the surface temperature approaching the dew point temperature. On the other hand, the controller 21 determines that a predictor of condensation does not exist in a case in which the calculated difference is greater than the threshold TH. This is because the surface temperature of the window 60 is considered to be high enough for it to still take time to reach the dew point temperature.

If it is determined in step S103 that a predictor of condensation exists, the process in step S104 is executed. Conversely, if it is determined in step S103 that a predictor of condensation does not exist, the process in step S101 is executed again.

In step S104, the controller 21 of the control apparatus 20 executes a condensation prevention process for preventing condensation on the window 60. Specifically, the controller 21 executes a process to control the condensation prevention apparatus 80, installed inside the chamber ER, via the communication interface 23 and to start operation of the condensation prevention apparatus 80. For example, the controller 21 performs control to initiate power supply to the condensation prevention apparatus 80 and start operation of the condensation prevention apparatus 80.

According to the present embodiment, the occurrence of condensation can be predicted in advance, and condensation prevention measures can be taken before condensation occurs, thus enabling prevention of the occurrence of condensation. Measurement errors in optical measurements caused by condensation can thereby be prevented.

As a variation of the present embodiment, the controller 21 of the control apparatus 20 may, as the condensation prevention process in step S104, output data D1 notifying the user that the predictor of the condensation exists or data D2 urging the user to take measures to prevent condensation. For example, the controller 21 displays the message "condensation is about to occur" as the data D1 on a display as the output interface 25. Alternatively, the controller 21 displays the message "insert desiccant" as the data D2 on a display as the output interface 25. The data D1 or D2 may be outputted as audio. Specifically, the controller 21 may output a message as the data D1 or data D2 from a speaker as the output interface 25. In a case in which the data D1 or data D2 is outputted as audio, the controller 21 may output an alarm sound instead of a message from the speaker. The user receiving the message or alarm sound outputted as the data D1 or data D2 can take measures to prevent condensation on the window 60 by, for example, injecting a desiccant into the chamber ER. According to the present variation, the user can recognize in advance that condensation will occur. For example, users can prevent condensation by taking condensation prevention measures themselves, even if no condensation prevention apparatus 80 is installed inside the chamber ER.

The concept employed in setting the threshold TH is now explained. The condensation prevention process is executed upon determining that a predictor of condensation exists because it is thought that the condensation can be more reliably prevented if the condensation prevention process is executed before the surface temperature of the window 60 reaches the dew point temperature. For example, suppose that it takes some time from the start of the condensation prevention process until the effect becomes apparent. In this case, the threshold TH is determined according to how many degrees Celsius the surface temperature of the window 60 drops from the start of the condensation prevention process until the effect appears. As an example, assume that the effect appears 10 seconds after the condensation prevention process is started. Assume further that the surface temperature of the window 60 falls by 5° C. in seconds. In this case, if the threshold TH is set at 5° C., the condensation prevention process will be executed before the surface temperature reaches the dew point temperature, and condensation can be prevented more reliably. The temperature set as the threshold TH based on this concept is also referred to below as the "first margin temperature". The threshold TH need not be a fixed value and may, for example, be set to a value obtained by multiplying the calculated dew point temperature obtained in step S102 by a predetermined ratio.

In step S105, the controller 21 of the control apparatus 20 sets a stopping condition for stopping the condensation prevention apparatus 80 with respect to the surface temperature of the window 60. Specifically, as a condition value V1 of the surface temperature of the window 60 serving as the stopping condition, the controller 21 sets a value obtained by simply adding a "second margin temperature", set separately from the "first margin temperature", to the measurement V0 of the surface temperature of the window 60 acquired in step S101 immediately before the start of operation of the condensation prevention apparatus 80. For example, if the measurement V0 of the surface temperature of the window 60 acquired immediately before the start of operation of the condensation prevention apparatus 80 is 26.6° C., and the "second margin temperature" is the same 5° C. as the "first margin temperature", the controller 21 sets the condition value V1 of the surface temperature of the window 60 as the stopping condition to 31.6° C. Alternatively, instead of simply adding the "second margin temperature", the controller 21 may, for example, multiply the measurement V0 of the surface temperature of the window 60 acquired immediately before the start of operation of the condensation prevention apparatus 80, or the calculated dew point temperature obtained in step S102, by a predetermined ratio and set the resulting calculated value as the condition value V1 of the surface temperature of the window 60 serving as the stopping condition. The "second margin temperature" may be set to a different temperature than the "first margin temperature".

In step S106, the temperature sensor 72 newly measures the surface temperature of the window 60 at the inside of the chamber ER. The controller 21 of the control apparatus 20 newly acquires the measurement of the surface temperature of the window 60 from the temperature sensor 72 via the communication interface 23. That is, the controller 21 obtains, via the communication interface 23, the measurement V2 of the window 60, at the inside of the chamber ER, after performance of the condensation prevention process.

In step S107, the controller 21 of the control apparatus 20 determines whether the measurement V2 acquired in step S106 satisfies the stopping condition. Specifically, the controller 21 compares the measurement V2 of the surface temperature of the window 60 acquired in step S106 with the condition value V1 of the surface temperature of the window 60 set as the stopping condition in step S105. The controller 21 determines that the stopping condition is satisfied in a case in which the measurement V2 is equal to or greater than the condition value V1 and determines that the stopping condition is not satisfied in a case in which the measurement V2 is less than the condition value V1.

If it is determined in step S107 that the stopping condition is satisfied, the process in step S108 is executed. If it is determined in step S107 that the stopping condition is not satisfied, the process returns to step S104, and the condensation prevention process continues.

In step S108, the controller 21 of the control apparatus 20 executes a process to control the condensation prevention apparatus 80, via the communication interface 23, and to stop the operation of the condensation prevention apparatus 80. For example, the controller 21 performs control to shut off the power supply to the condensation prevention apparatus 80 and stop the operation of the condensation prevention apparatus 80.

By execution of the processes from step S105 to step S108 in the present embodiment, operating costs can be reduced by suppressing unnecessary operation of the condensation prevention apparatus 80. By stopping operation of the condensation prevention apparatus 80, the operating time of the condensation prevention apparatus 80 can be reduced, and the duration of consumables used in the condensation prevention apparatus 80 can be extended.

Figure 7:
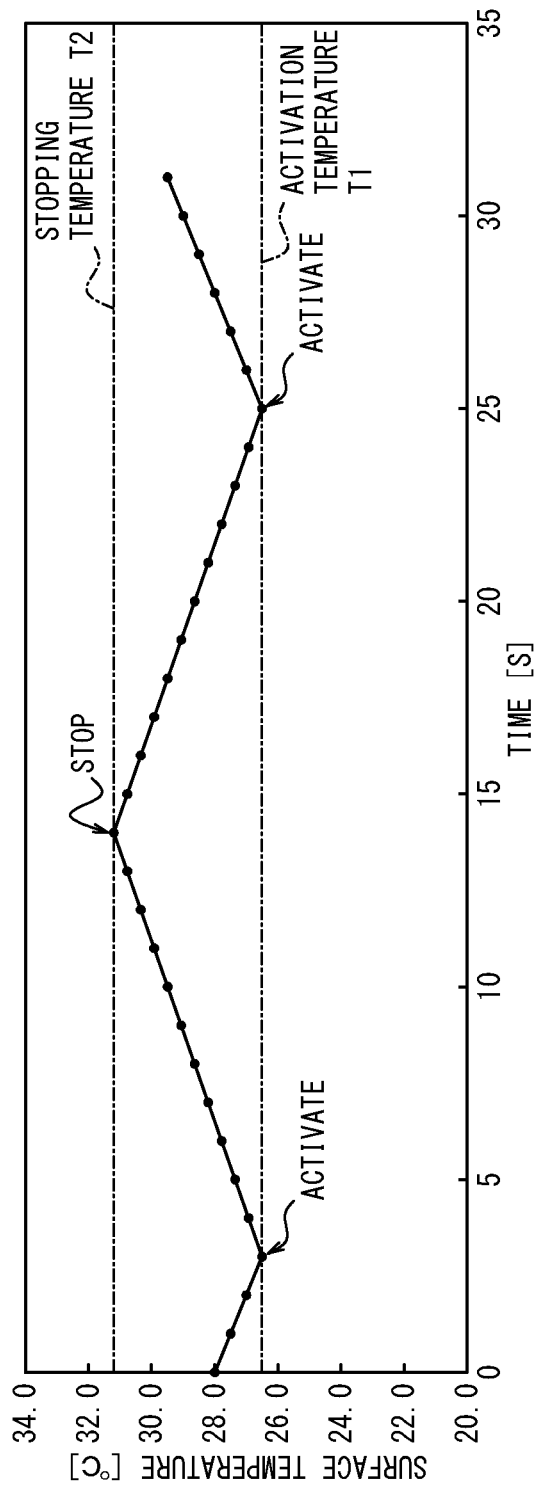
FIG. 7 is a diagram illustrating an example of operations of a condensation prevention apparatus controlled by a method of preventing condensation according to an embodiment of the present disclosure.

Examples of the control of the condensation prevention apparatus 80 performed using the method of preventing condensation according to the present embodiment are described specifically with reference to FIGS. 6 and 7.

As an example, suppose that the measurements of ambient temperature and humidity acquired in step S101 from the temperature and humidity sensor 71 included in the sensor group 70 are 30.0° C. and 60.0%. In step S102, the controller 21 of the control apparatus 20 calculates the dew point temperature to be 21.6° C. with reference to the conversion table in FIG. 6.

In the method of preventing condensation according to the present embodiment, as described above, the operation of the condensation prevention apparatus 80 is started in a case in which the difference yielded by subtracting the calculated dew point temperature obtained in step S102 from the measurement of the surface temperature of the window 60 acquired in step S101 is greater than 0 and is equal to or less than the "first margin temperature" set as the threshold TH. Therefore, in the present example, the temperature obtained by simply adding the "first margin temperature" to the calculated dew point temperature corresponds to an activation temperature T1. The activation temperature T1 is the temperature at which the condensation prevention apparatus 80 is activated. In the present example, the "first margin temperature" is 5° C. Simple addition of the "first margin temperature" of 5° C. to the calculated dew point temperature of 21.6° C. results in an activation temperature T1 of 26.6° C. Alternatively, instead of the value yielded by simply adding the "first margin temperature" to the dew point temperature, the activation temperature T1 may, for example, be a value obtained by multiplying the dew point temperature by a predetermined ratio.

In the method of preventing condensation according to the present embodiment, as described above, the value obtained by simply adding the "second margin temperature", which is set separately from the "first margin temperature", to the measurement V0 of the surface temperature of the window 60 acquired in step S101 immediately before the condensation prevention apparatus 80 starts operating is set as the condition value V1 of the surface temperature of the window 60, and operation of the condensation prevention apparatus 80 is stopped in a case in which the measurement V2 of the surface temperature of the window 60, acquired in step S106, after the condensation prevention process is executed is equal to or greater than the condition value V1. Therefore, in the present example, the temperature obtained by simply adding the "second margin temperature" to the set activation temperature T1 corresponds to a stopping temperature T2. The stopping temperature T2 is the temperature at which the condensation prevention apparatus 80 is stopped. In the present example, the "second margin temperature" is 5° C. Simple addition of the "second margin temperature" of 5° C. to the set activation temperature T1 of 26.6° C. results in a stopping temperature T2 of 31.6° C. Alternatively, instead of the value yielded by simply adding the "second margin temperature" to the activation temperature T1, the stopping temperature T2 may, for example, be a value obtained by multiplying the activation temperature T1 by a predetermined ratio.

Referring to FIG. 7, the timing of activation and stopping of the condensation prevention apparatus 80 controlled using the method of preventing condensation according to the present embodiment is now described. For the sake of convenience, an example of proportional control of the condensation prevention apparatus 80 is illustrated here, but control of the condensation prevention apparatus 80 is not limited to proportional control. That is, any control method can be used, such as on-off control or feedback control, as long as the activation and stopping of the condensation prevention apparatus 80 are controlled as necessary. For simplicity, the dew point temperature is assumed to be constant. In FIG. 7, the vertical axis represents the surface temperature of the window 60 [° C.] and the horizontal axis represents time [seconds]. The dew point temperature is assumed to be 21.6° C., the activation temperature T1 to be 26.6° C., and the stopping temperature T2 to be 31.6° C. When the measuring instrument 10 is activated and measurement begins, the window 60 is cooled by the sample 41, and the surface temperature of the window 60 falls. Upon the surface temperature of the window 60 reaching the activation temperature T1 of 26.6° C., the difference between the dew point temperature and the surface temperature of the window 60 becomes equal to or less than the threshold TH. It is then determined in step S103 that a predictor of condensation exists, and the condensation prevention process in step S104 is executed. Consequently, the condensation prevention apparatus 80 is activated. Upon activation of the condensation prevention apparatus 80, the surface temperature of the window 60 rises.

Upon the surface temperature of the window 60 reaching the stopping temperature T2 of 31.6° C., it is determined in step S107 that the stopping condition for stopping operation of the condensation prevention apparatus 80 is satisfied, and the process in step S108 is executed. Consequently, the condensation prevention apparatus 80 stops. The series of processes from step S101 to step S108 is repeated until operation of the measuring instrument 10 is completed, and the condensation prevention apparatus 80 is operated as necessary.

As described above, in the present embodiment, the controller 21 of the control apparatus 20 executes a condensation prevention process for preventing condensation on the window 60 according to the ambient temperature and humidity of the chamber ER and the surface temperature of the window 60 at the inside of the chamber ER, the chamber ER including the window 60 and housing a light receiving element 31 that receives light entering the chamber ER from the window 60 via the sample 41 for measurement located in a space outside the chamber ER. Therefore, the efficiency of condensation prevention measures is improved, since the condensation prevention process is executed as necessary without visual observation of the window 60.

As a variation of the present embodiment, the sensor group 70 may further include an air pressure sensor that measures the ambient air pressure of the chamber ER. In step S101, the controller 21 of the control apparatus 20 may acquire the measurement of the ambient air pressure obtained by the air pressure sensor from the sensor group 70 via the communication interface 23 and may calculate the dew point temperature based further on the acquired measurement of the ambient air pressure. Specifically, the controller 21 may calculate the dew point temperature by referring to a dew point temperature conversion table or the like calculated based on the ambient temperature and humidity and the air pressure.

According to the present variation, the dew point temperature is calculated by taking into account the effect of fluctuations in the ambient air pressure of the chamber ER. The dew point temperature can therefore be calculated even more accurately.

As a variation of the present embodiment, the processing of step S105 may be omitted. In step S107, instead of determining whether the measurement V2 acquired in step S106 satisfies the stopping condition, the controller 21 of the control apparatus 20 may make a new determination of whether a predictor of condensation exists. Specifically, the controller 21 may determine whether a predictor of condensation exists by comparing the calculated dew point temperature obtained in step S102 with the measurement V2 of the surface temperature of the window 60 acquired in step S106. More specifically, the controller 21 may calculate the difference yielded by subtracting the calculated dew point temperature corresponding to the measured ambient temperature and humidity of the chamber ER obtained by the temperature and humidity sensor 71 from the measurement V2 of the surface temperature of the window 60 obtained by the temperature sensor 72. The controller 21 may determine that a predictor of condensation exists in a case in which the calculated difference is greater than 0 and equal to or less than a threshold TH and that a predictor of condensation does not exist in a case in which the calculated difference is greater than the threshold TH. In step S106, in addition to the measurement V2 of the surface temperature of the window 60, the controller 21 may acquire the measurement V3 of the ambient temperature and humidity of the chamber ER, after execution of the condensation prevention process, obtained by the temperature and humidity sensor 71, may calculate the dew point temperature corresponding to the acquired measurement V3, and may use the newly obtained calculated value of the dew point temperature in step S107. If it is determined in step S107 that a predictor of condensation no longer exists, the process in step S108 is executed. If it is determined in step S107 that a predictor of condensation still exists, the process returns to step S104, and the condensation prevention process continues.

Figure 8:
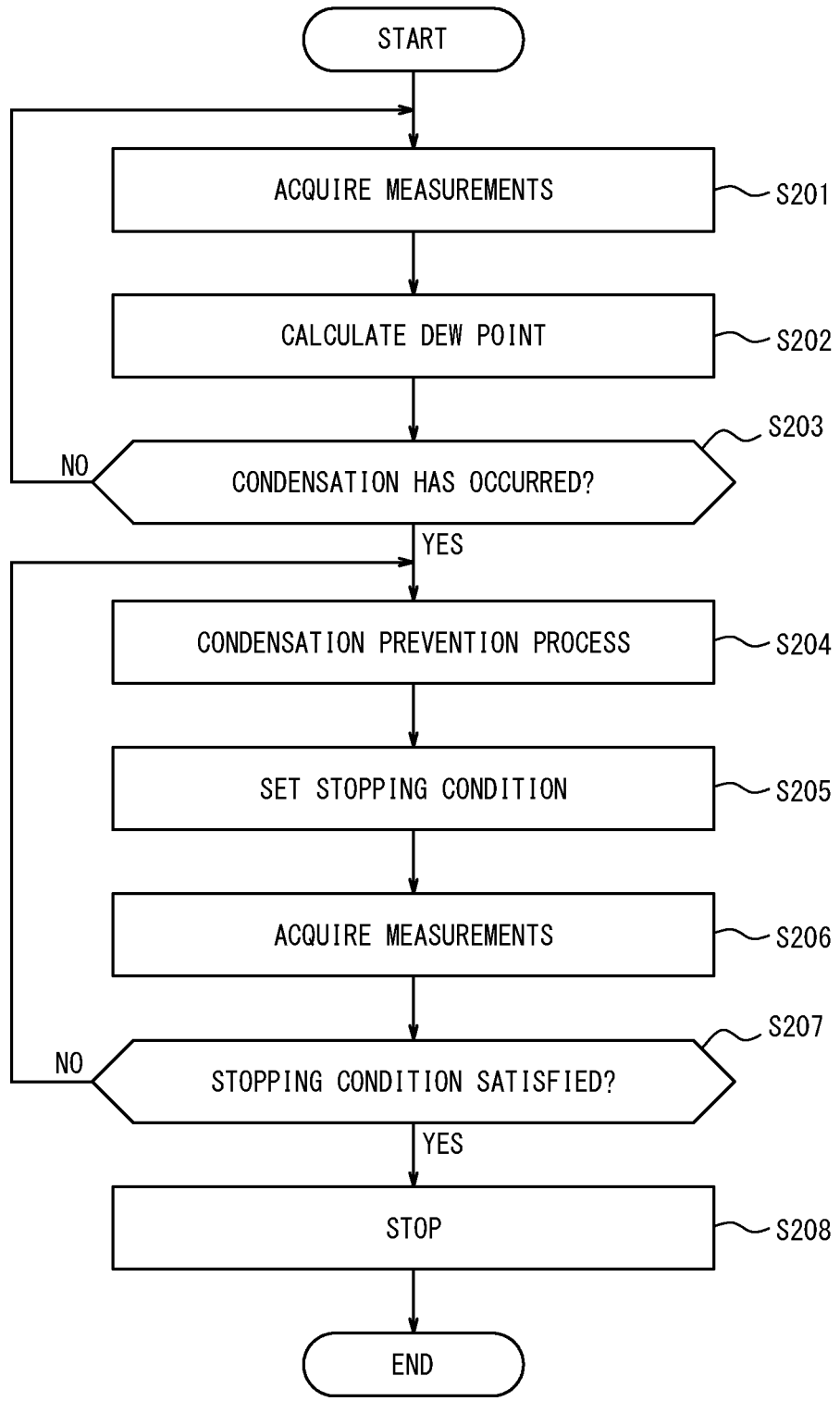
FIG. 8 is a flowchart illustrating operations of a measuring instrument according to a variation of an embodiment of the present disclosure.

As a variation of the present embodiment, the controller 21 of the control apparatus 20 may determine whether condensation has occurred instead of determining whether a predictor of condensation exists. With reference to FIG. 8, operations of the measuring instrument 10 according to the present variation are described. These operations correspond to a method of preventing condensation according to the present variation.

The processes of step S201 and step S202 are the same as those of step S101 and step S102. Hence, an explanation thereof is omitted.

In step S203, the controller 21 of the control apparatus 20 determines whether condensation has occurred. Specifically, the controller 21 determines whether condensation has occurred by comparing the calculated dew point temperature obtained in step S202 with the measurement of the surface temperature of the window 60 acquired in step S201. More specifically, the controller 21 determines that condensation has occurred in a case in which the measurement of the surface temperature of the window 60 obtained by the temperature sensor 72 is equal to or less than the calculated dew point temperature corresponding to the measured ambient temperature and humidity of the chamber ER obtained by the temperature and humidity sensor 71. Conversely, the controller 21 determines that condensation has not occurred in a case in which the measurement of the surface temperature of the window 60 obtained by the temperature sensor 72 is greater than the calculated dew point temperature corresponding to the measured ambient temperature and humidity of the chamber ER obtained by the temperature and humidity sensor 71.

If it is determined in step S203 that condensation has occurred, the process in step S204 is executed. Conversely, if it is determined in step S203 that condensation has not occurred, the process in step S201 is executed again.

In step S204, the controller 21 of the control apparatus 20 executes a similar condensation prevention process to that of step S104. Specifically, the controller 21 executes a process to control the condensation prevention apparatus 80, installed inside the chamber ER, via the communication interface 23 and to start operation of the condensation prevention apparatus 80. For example, the controller 21 performs control to initiate power supply to the condensation prevention apparatus 80 and start operation of the condensation prevention apparatus 80.

According to the present variation, the existence of condensation can be determined without visual observation of the window 60, thereby improving the efficiency of condensation prevention measures, since condensation prevention measures can be taken as necessary.

As a further variation of the present variation, the controller 21 of the control apparatus 20 may, as the condensation prevention process in step S204, output data D3 notifying the user that condensation has occurred or data D4 urging the user to take measures to remove the condensation. For example, the controller 21 displays the message "condensation has occurred" as the data D3 on a display as the output interface 25. Alternatively, the controller 21 displays the message "insert desiccant" as the data D4 on a display as the output interface 25. The data D3 or D4 may be outputted as audio. Specifically, the controller 21 may output a message as the data D3 or data D4 from a speaker as the output interface 25. In a case in which the data D3 or data D4 is outputted as audio, the controller 21 may output an alarm sound instead of a message from the speaker. The user receiving the message or alarm sound outputted as the data D3 or data D4 can take measures to remove condensation on the window 60 by, for example, injecting a desiccant into the chamber ER. According to the present variation, users can also recognize the occurrence of condensation without visual observation of the window 60. For example, users can remove condensation by taking condensation prevention measures themselves, even if no condensation prevention apparatus 80 is installed inside the chamber ER.

In step S205, the controller 21 of the control apparatus 20 sets a stopping condition for stopping the condensation prevention apparatus 80 with respect to the surface temperature of the window 60. Specifically, as a condition value V4 of the surface temperature of the window 60 serving as the stopping condition, the controller 21 sets a value obtained by simply adding a "margin temperature", set in advance, to the measurement V0 of the surface temperature of the window 60 acquired in step S201 immediately before the start of operation of the condensation prevention apparatus 80. For example, if the measurement V0 of the surface temperature of the window 60 acquired immediately before the start of operation of the condensation prevention apparatus 80 is 21.6° C., and the "margin temperature" is 5° C., the controller 21 sets the condition value V4 of the surface temperature of the window 60 as the stopping condition to 26.6° C. Alternatively, instead of simply adding the "margin temperature", the controller 21 may, for example, multiply the measurement V0 of the surface temperature of the window 60 acquired immediately before the start of operation of the condensation prevention apparatus 80, or the calculated dew point temperature obtained in step S202, by a predetermined ratio and set the resulting calculated value as the condition value V4 of the surface temperature of the window 60 serving as the stopping condition.

The process in step S206 is the same as that in step S106. Hence, an explanation thereof is omitted.

In step S207, the controller 21 of the control apparatus 20 determines whether the measurement V2 acquired in step S206 satisfies the stopping condition. Specifically, the controller 21 compares the measurement V2 of the surface temperature of the window 60 acquired in step S206 with the condition value V4 of the surface temperature of the window 60 set as the stopping condition in step S205. The controller 21 determines that the stopping condition is satisfied in a case in which the measurement V2 is equal to or greater than the condition value V4 and determines that the stopping condition is not satisfied in a case in which the measurement V2 is less than the condition value V4.

If it is determined in step S207 that the stopping condition is satisfied, the process in step S208 is executed. If it is determined in step S207 that the stopping condition is not satisfied, the process returns to step S204, and the condensation prevention process continues.

In step S208, the controller 21 of the control apparatus 20 executes a process to control the condensation prevention apparatus 80, via the communication interface 23, and to stop the operation of the condensation prevention apparatus 80. For example, the controller 21 performs control to shut off the power supply to the condensation prevention apparatus 80 and stop the operation of the condensation prevention apparatus 80.

By execution of the processes from step S205 to step S208 in the present variation, operating costs can be reduced by suppressing unnecessary operation of the condensation prevention apparatus 80. By stopping operation of the condensation prevention apparatus 80, the operating time of the condensation prevention apparatus 80 can be reduced, and the duration of consumables used in the condensation prevention apparatus 80 can be extended.

As yet another variation of the present variation, the processing of step S105 may be omitted. In step S207, instead of determining whether the measurement V2 acquired in step S206 satisfies the stopping condition, the controller 21 of the control apparatus 20 may make a new determination of whether condensation has occurred. Specifically, the controller 21 may determine whether condensation has occurred by comparing the calculated dew point temperature obtained in step S202 with the measurement V2 of the surface temperature of the window 60 acquired in step S206. More specifically, the controller 21 may determine that condensation is still occurring in a case in which the measurement V2 of the surface temperature of the window 60 obtained by the temperature sensor 72 is equal to or less than the calculated dew point temperature corresponding to the measured ambient temperature and humidity of the chamber ER obtained by the temperature and humidity sensor 71 and determine that condensation is no longer occurring in a case in which the measurement V2 of the surface temperature of the window 60 obtained by the temperature sensor 72 is greater than the calculated dew point temperature corresponding to the measured ambient temperature and humidity of the chamber ER obtained by the temperature and humidity sensor 71. In step S206, in addition to the measurement V2 of the surface temperature of the window 60, the controller 21 may acquire the measurement V3 of the ambient temperature and humidity of the chamber ER, after execution of the condensation prevention process, obtained by the temperature and humidity sensor 71, may calculate the dew point temperature corresponding to the acquired measurement V3, and may use the newly obtained calculated value of the dew point temperature in step S207. If it is determined in step S207 that condensation is no longer occurring, the process in step S208 is executed. If it is determined in step S207 that condensation is still occurring, the process returns to step S204, and the condensation prevention process continues.

As a variation of the present embodiment, the controller 21 of the control apparatus 20 may provide notification in a case in which wear and tear of components and the like included in the condensation prevention apparatus 80 reaches a certain level. In such a variation, the controller 21 counts the cumulative operating time of the components included in the condensation prevention apparatus 80 and determines whether the counted cumulative operating time has reached a predefined duration of the components. When it is determined that the cumulative operating time has reached or exceeded the duration, the controller 21 outputs data D5 to notify the user that a component needs to be replaced or data D6 to urge the user to replace the component. For example, the controller 21 displays the message "component requires replacement" as the data D5 on a display as the output interface 25. Alternatively, the controller 21 displays the message "please replace component" as the data D6 on a display as the output interface 25. The data D5 or D6 may be outputted as audio. Specifically, the controller 21 may output a message as the data D5 or data D6 from a speaker as the output interface 25. In a case in which the data D5 or data D6 is outputted as audio, the controller 21 may output an alarm sound instead of a message from the speaker.

The present disclosure is not limited to the above embodiments. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, as an aspect of the present disclosure, the case in which the light receiving apparatus 30 is housed in the chamber ER has been described as an example, but as another aspect, the light source apparatus 50 that irradiates light on the sample 41 through a window similar to the window 60 may be housed in another chamber ERa similar to the chamber ER. Except for the light receiving apparatus 30, the same internal configuration as the chamber ER may be applied. In such a configuration, a sensor group inside the chamber ERa measures the ambient temperature and humidity and the surface temperature of the window at the inside of the chamber ERa. The controller 21 of the control apparatus 20 acquires each measurement of the ambient temperature and humidity and the surface temperature of the window from the sensor group inside the chamber ERa via the communication interface 23. The controller 21 executes a condensation prevention process for preventing condensation on the window of the chamber ERa according to each of the acquired measurements. The specific operations of the control apparatus 20 are similar to operations for the window 60 of the chamber ER. Hence, an explanation thereof is omitted.

For example, as an aspect of the present disclosure, the measuring instrument 10, which is a turbidimeter using the transmitted-scattered light method, has been described as an example, but the above embodiment is not limited to the measuring instrument 10 as long as an apparatus that optically measures the state of a sample 41 for measurement is used. For example, the present embodiment may be applied to a turbidimeter that uses any appropriate method such as the transmitted light method, scattered light method (for example, a right angle scattering type), transmitted-scattered light method, surface scattered light method, or integrating sphere method.

For example, a turbidimeter has been described as an example of the measuring instrument 10 as an aspect of the present disclosure, but the above embodiment is not limited to a turbidimeter, as long as an apparatus that optically measures the state of the sample 41 is used. For example, the present embodiment may be applied to any appropriate apparatus such as a residual chlorine meter, pH meter, differential pressure gauge, pressure gauge, flow meter, or colorimeter.

The invention claimed is:

1. A control apparatus comprising a controller configured to execute a condensation prevention process for preventing condensation on a window according to an ambient temperature and humidity of a chamber and a surface temperature of the window at an inside of the chamber, the chamber comprising the window and housing a light receiving element configured to receive light entering the chamber from the window via a sample for measurement located in a space outside the chamber or a light source configured to irradiate light on the sample through the window, wherein as the condensation prevention process, the controller is configured to execute a process to control a condensation prevention apparatus installed inside the chamber and to start operation of the condensation prevention apparatus, and wherein the controller is configured to set a condition value of the surface temperature as a stopping condition for stopping the condensation prevention apparatus with respect to the surface temperature of the window, and in a case in which a surface temperature of the window at the inside of the chamber after execution of the condensation prevention process is equal to or greater than the condition value, execute a process to control the condensation prevention apparatus and to stop the operation of the condensation prevention apparatus.

2. The control apparatus according to claim 1, wherein the controller is configured to calculate a dew point temperature inside the chamber based on the ambient temperature and humidity of the chamber, determine whether a predictor of the condensation exists or whether the condensation has occurred by comparing the calculated dew point temperature with the surface temperature of the window, and execute the condensation prevention process upon determining that the predictor of the condensation exists or that the condensation has occurred.

3. The control apparatus according to claim 2, wherein as the condensation prevention process, the controller is configured to execute a process to output data notifying a user that the predictor of the condensation exists or that the condensation has occurred, or data urging the user to take measures to prevent the condensation.

4. The control apparatus according to claim 2, wherein the controller is configured to determine that the predictor of the condensation exists in a case in which a difference yielded by subtracting the dew point temperature from the surface temperature of the window is greater than 0 and equal to or less than a threshold and determine that the predictor of the condensation does not exist in a case in which the difference is greater than the threshold.

5. The control apparatus according to claim 2, wherein the controller is configured to determine that the condensation has occurred in a case in which the surface temperature of the window is equal to or less than the dew point temperature and determine that the condensation has not occurred in a case in which the surface temperature of the window is greater than the dew point temperature.

6. The control apparatus according to claim 2, wherein the controller is configured to calculate the dew point temperature based further on an ambient air pressure of the chamber.

7. A measuring instrument comprising:
the control apparatus according to claim 1;
the chamber;
the light receiving element or the light source; and
a sensor group configured to measure the ambient temperature and humidity of the chamber and the surface temperature of the window.

8. The measuring instrument according to claim 7, wherein the control apparatus is configured to measure turbidity of the sample based on light received by the light receiving element.

9. A method of preventing condensation comprising:
measuring an ambient temperature and humidity and a surface temperature of a window at an inside of a chamber comprising the window and housing a light receiving element configured to receive light entering the chamber from the window via a sample for measurement located in a space outside the chamber or a light source configured to irradiate light on the sample through the window; and
executing a condensation prevention process for preventing condensation on the window according to respective measurements of the ambient temperature and humidity and the surface temperature of the window,
wherein the condensation prevention process includes executing a process to control a condensation prevention apparatus installed inside the chamber and to start operation of the condensation prevention apparatus, and
wherein the method further comprises setting a condition value of the surface temperature as a stopping condition for stopping the condensation prevention apparatus with respect to the surface temperature of the window, and in a case in which a surface temperature of the window at the inside of the chamber after execution of the condensation prevention process is equal to or greater than the condition value, executing a process to control the condensation prevention apparatus and to stop the operation of the condensation prevention apparatus.

* * * * *